(12) United States Patent
Afek et al.

(10) Patent No.: US 12,449,614 B1
(45) Date of Patent: Oct. 21, 2025

(54) OPTICAL SYSTEMS WITH ONE DIMENSIONAL EYE TRACKING

(71) Applicant: Apple Inc., Cupertino, CA (US)

(72) Inventors: Itai Afek, Ramat Gan (IL); Ariel Lipson, Tel Aviv (IL); Daniel Ott, Boulder, CO (US); Maria I Campana, Boulder, CO (US); Roei Remez, Tel Aviv (IL); Lionel E Edwin, San Jose, CA (US); Michael Young, Broomfield, CO (US)

(73) Assignee: Apple Inc., Cupertino, CA (US)

( * ) Notice: Subject to any disclaimer, the term of this patent is extended or adjusted under 35 U.S.C. 154(b) by 152 days.

(21) Appl. No.: 18/525,306

(22) Filed: Nov. 30, 2023

Related U.S. Application Data

(60) Provisional application No. 63/476,782, filed on Dec. 22, 2022.

(51) Int. Cl.
*G02B 6/42* (2006.01)
*H04N 23/20* (2023.01)

(52) U.S. Cl.
CPC ........... *G02B 6/4206* (2013.01); *H04N 23/20* (2023.01)

(58) Field of Classification Search
CPC .............................. G02B 6/4206; H04N 23/20
See application file for complete search history.

(56) References Cited

U.S. PATENT DOCUMENTS

| | | | |
|---|---|---|---|
| 11,106,033 B2 | 8/2021 | Edwin et al. | |
| 11,474,358 B2 | 10/2022 | Meitav et al. | |
| 2019/0086674 A1 | 3/2019 | Sinay et al. | |
| 2020/0159030 A1 | 5/2020 | Ayres et al. | |
| 2021/0247610 A1* | 8/2021 | Bhakta ................ | G02B 6/0016 |
| 2022/0011578 A1 | 1/2022 | Sinay et al. | |
| 2022/0035161 A1 | 2/2022 | Sinay et al. | |
| 2022/0099977 A1 | 3/2022 | Meitav et al. | |

* cited by examiner

*Primary Examiner* — Kathleen V Nguyen
(74) *Attorney, Agent, or Firm* — Treyz Law Group, P.C.; Michael H. Lyons

(57) ABSTRACT

A display may use a waveguide to provide image light to an eye box. An emitter may emit infrared light collimated at different angles relative to a collimated axis and divergent along an orthogonal axis. The waveguide may propagate the infrared light and may include overlapping one-dimensional diffractive gratings with parallel periodic structures. Each grating may diffract, towards the eye box, a respective portion of the infrared light from a respective incident angle onto a respective output angle relative to the collimated axis. A camera may capture glints of the infrared light as reflected off a user's eye at the eye box for performing gaze tracking. The emitter and the gratings may effectively form a one-dimensional line of infrared emitters overlapping the eye box while allowing the optical emitter to remain invisible to a user.

20 Claims, 9 Drawing Sheets

OPTICAL SYSTEMS WITH ONE DIMENSIONAL EYE TRACKING

This application claims the benefit of U.S. Provisional Patent Application No. 63/476,782, filed Dec. 22, 2022, which is hereby incorporated by reference herein in its entirety.

BACKGROUND

This disclosure relates to optical systems such as optical systems in electronic devices having displays.

Electronic devices can include displays that provide images near the eyes of a user. Such electronic devices often include virtual or augmented reality headsets with displays having optical elements that allow users to view the displays. If care is not taken, components used to display images can be bulky and might not exhibit desired levels of optical performance.

SUMMARY

An electronic device may have a display system for providing image light to an eye box. The display system may include a waveguide. A projector may generate image light. An input coupler may couple the image light into the waveguide. An output coupler may couple the image light out of the waveguide and towards the eye box.

The display system may include an optical emitter that emits infrared light. The infrared light may be collimated at a set of different angles with respect to a collimated axis. The infrared light may be divergent along a diverging axis orthogonal to the collimated axis. An optical coupler may couple the infrared light into the waveguide. The waveguide may propagate the infrared light via total internal reflection. The waveguide may include overlapping one-dimensional diffractive gratings having parallel periodic structures (e.g., fringes) that extend in a single direction (e.g., parallel to a diverging axis and perpendicular to a collimated axis). The infrared light may be incident upon the one-dimensional diffractive gratings at different incident angles. Each diffractive grating may diffract a respective portion (e.g., wavelengths) of the infrared light from a respective incident angle onto a respective output angle oriented out of the waveguide and towards the eye box. If desired, different sequential gratings in space may diffract light at different output angles. If desired, different gratings may diffract different wavelengths onto different output angels and the wavelength of the light may be adjusted over time. Each of the output angles is measured with respect to the collimated axis, whereas the infrared light remains divergent along the diverging axis. If desired, the infrared light may be collimated along two perpendicular axes. A camera may capture glints of the infrared light as reflected off a user's eye at the eye box.

The optical emitter may include a set of light sources that emit the infrared light to a cylindrical lens that collimates the light at the set of different angles along the collimated axis while the infrared light remains divergent along the diverging axis. If desired, the optical emitter may include a single light source that emits the infrared light to a diffractive optical element (DOE) that diffracts the light at the set of different angles along the collimated axis while the infrared light remains divergent along the diverging axis. If desired, the optical emitter may include an array of light sources arranged in rows and a lenslet array or diffuser overlapping the array of light sources. The lenslets overlapping each row may redirect the infrared light at different angles from the set of angles along the collimated axis while the infrared light remains divergent along the diverging axis.

In this way, the optical emitter and the one dimensional diffractive gratings may effectively form a one-dimensional line of infrared emitters overlapping the eye box, while allowing the optical emitter to remain outside of the field of view of the eye box and thus invisible to a user. This may allow for robust and accurate glint measurements as well as for the measurement of the horizontal position of the eye within the eye box. If desired, the infrared light may be collimated along additional collimated axes and additional one-dimensional diffractive gratings may be provided to output the infrared light at different angles with respect to the additional collimated axes.

DETAILED DESCRIPTION

Figure 1:
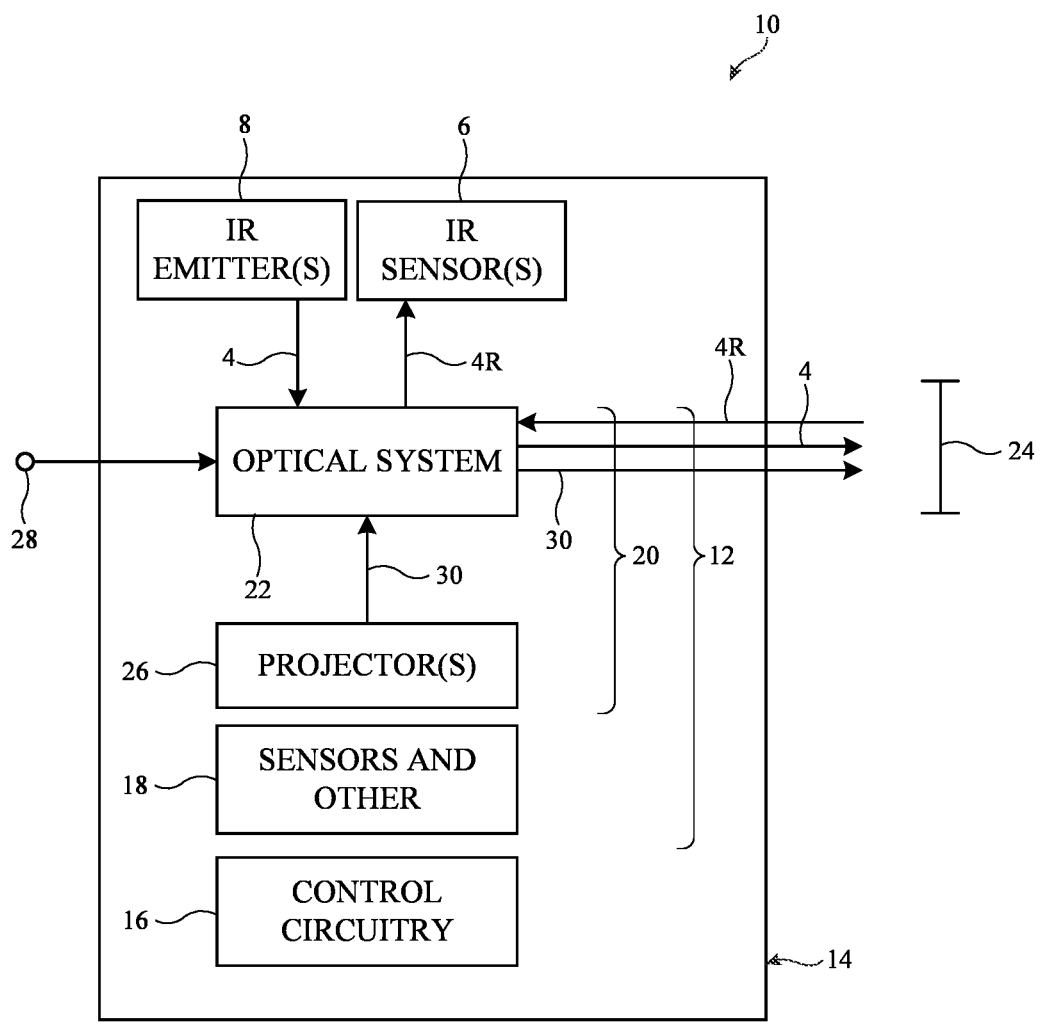
FIG. 1 is a diagram of an illustrative system having a display with a gaze tracking sensor in accordance with some embodiments.

System 10 of FIG. 1 may be an electronic device such as a head-mounted device having one or more displays. The displays in system 10 may include near-eye displays 20 mounted within support structure (housing) 14. Support structure 14 may have the shape of a pair of eyeglasses or goggles (e.g., supporting frames), may form a housing having a helmet shape, or may have other configurations to help in mounting and securing the components of near-eye displays 20 on the head or near the eye of a user. Near-eye displays 20 may include one or more display projectors such as projectors 26 (sometimes referred to herein as display modules 26) and one or more optical systems such as optical systems 22. Projectors 26 may be mounted in a support structure such as support structure 14. Each projector 26 may emit image light 30 that is redirected towards a user's eyes at eye box 24 using an associated one of optical systems 22. Image light 30 may be, for example, visible light (e.g., including wavelengths from 400-700 nm) that contains and/or represents something viewable such as a scene or object (e.g., as modulated onto the image light using the image data provided by the control circuitry to the display module).

The operation of system 10 may be controlled using control circuitry 16. Control circuitry 16 may include storage and processing circuitry for controlling the operation of system 10. Control circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may include one or more processors (e.g., microprocessors, microcontrollers, digital signal processors, baseband processors, etc.), power management units, audio chips, graphics processing units, application specific integrated circuits, and other integrated circuits. Software code may be stored on storage in control circuitry 16 and run on processing circuitry in control circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Projectors 26 may include liquid crystal displays, organic light-emitting diode displays, laser-based displays, or displays of other types. Projectors 26 may include light sources, emissive display panels, transmissive display panels that are illuminated with illumination light from light sources to produce image light, reflective display panels such as digital micromirror display (DMD) panels and/or liquid crystal on silicon (LCOS) display panels that are illuminated with illumination light from light sources to produce image light 30, etc.

Optical systems 22 may form lenses that allow a viewer (see, e.g., a user's eyes at eye box 24) to view images on display(s) 20. There may be two optical systems 22 (e.g., for forming left and right lenses) associated with respective left and right eyes of the user. A single display 20 may produce images for both eyes or a pair of displays 20 may be used to display images. In configurations with multiple displays (e.g., left and right eye displays), the focal length and positions of the lenses formed by system 22 may be selected so that any gap present between the displays will not be visible to a user (e.g., so that the images of the left and right displays overlap or merge seamlessly).

If desired, optical system 22 may contain components (e.g., an optical combiner, etc.) to allow real-world light (sometimes referred to as world light) from real-world (external) objects such as object 28 to be combined optically with virtual (computer-generated) images such as virtual images in image light 30. In this type of system, which is sometimes referred to as an augmented reality system, a user of system 10 may view both real-world content (e.g., world light from object 28) and computer-generated content that is overlaid on top of the real-world content. Camera-based augmented reality systems may also be used in device 10 (e.g., in an arrangement in which a camera captures real-world images of object 28 and this content is digitally merged with virtual content at optical system 22).

System 10 may, if desired, include wireless circuitry and/or other circuitry to support communications with a computer or other external equipment (e.g., a computer that supplies display 20 with image content). During operation, control circuitry 16 may supply image content to display 20. The content may be remotely received (e.g., from a computer or other content source coupled to system 10) and/or may be generated by control circuitry 16 (e.g., text, other computer-generated content, etc.). The content that is supplied to display 20 by control circuitry 16 may be viewed by a viewer at eye box 24.

If desired, system 10 may include an optical sensor. The optical sensor may be used to gather optical sensor data associated with a user's eyes at eye box 24. The optical sensor may, for example, be a gaze tracking sensor that gathers optical sensor data such as gaze image data (gaze tracking image data or gaze tracking sensor data) from a user's eye at eye box 24. Control circuitry 16 may process the optical sensor data to identify and track the direction of the user's gaze in real time. Control circuitry 16 may perform any desired operations based on the tracked direction of the user's gaze over time.

As shown in FIG. 1, the optical sensor (gaze tracking sensor) may include one or more optical emitters such as infrared emitter(s) 8 and one or more optical receivers (sensors) such as infrared sensor(s) 6 (sometimes referred to herein as optical sensor 6). Infrared emitter(s) 8 may include one or more light sources that emit sensing light such as light 4. Light 4 may be used for performing optical sensing on/at eye box 24 (e.g., gaze tracking) rather than conveying pixels of image data such as in image light 30. Light 4 may include infrared light. The infrared light may be at infrared (IR) wavelengths and/or near-infrared (NIR) wavelengths (e.g., any desired wavelengths from around 700 nm to around 10 um). Light 4 may additionally or alternatively include wavelengths less than 700 nm if desired. Light 4 may sometimes be referred to herein as sensor light 4.

Infrared emitter(s) 8 may direct light 4 towards optical system 22. Optical system 22 may direct the light 4 emitted by infrared emitter(s) 8 towards eye box 24. Light 4 may enter the user's eye at eye box 24 and may reflect off portions (regions) of the user's eye (e.g., the user's retina, iris, and cornea) as reflected light 4R (sometimes referred to herein as reflected sensor light 4R or a reflected version of light 4). Optical system 22 may receive reflected light 4R and may direct reflected light 4R towards infrared sensor(s)

6. Infrared sensor(s) 6 may receive reflected light 4R from optical system 22 and may gather (e.g., generate, measure, sense, produce, etc.) optical sensor data in response to the received reflected light 4R. Infrared sensor(s) 6 may include an image sensor or camera (e.g., an infrared image sensor or camera), for example. Infrared sensor(s) 6 may include, for example, one or more image sensor pixels (e.g., arrays of image sensor pixels). The optical sensor data may include image sensor data (e.g., image data, infrared image data, one or more images, etc.). Infrared sensor(s) 6 may pass the optical sensor data to control circuitry 16 for further processing.

Figure 2:
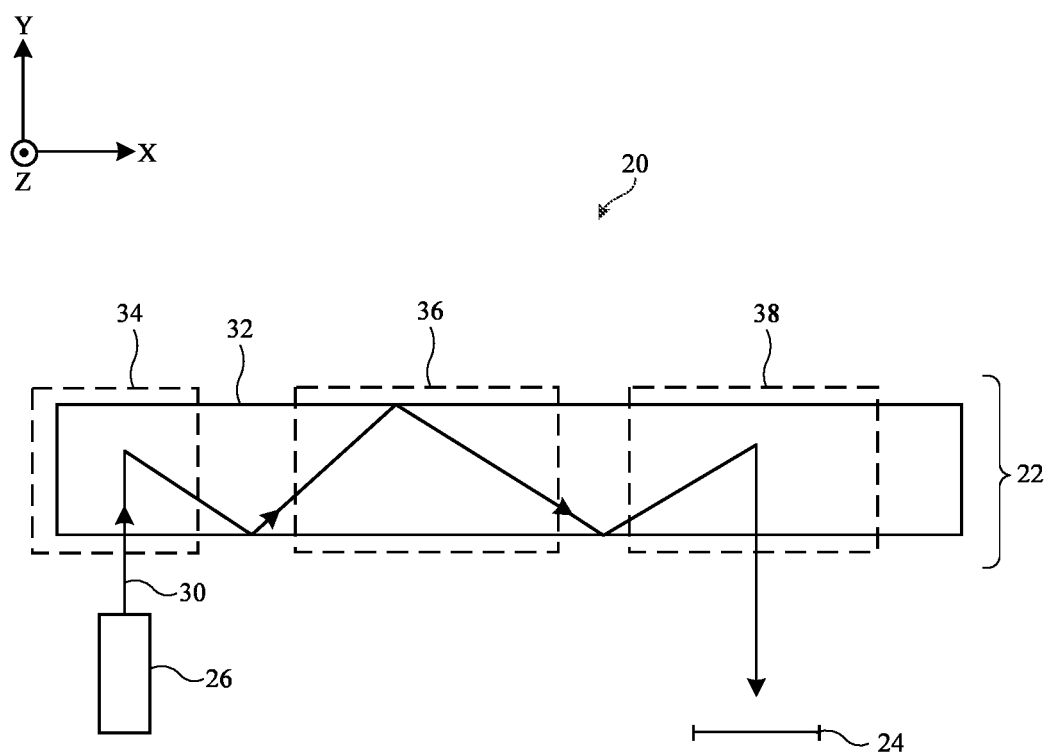
FIG. 2 is a top view of an illustrative optical system for a display having a waveguide with optical couplers in accordance with some embodiments.

FIG. 2 is a top view of an illustrative display 20 that may be used in system 10 of FIG. 1. As shown in FIG. 2, display 20 may include a projector such as projector 26 and an optical system such as optical system 22. Optical system 22 may include optical elements such as one or more waveguides 32. Waveguide 32 may include one or more stacked substrates (e.g., stacked planar and/or curved layers sometimes referred to herein as waveguide substrates) of optically transparent material such as plastic, polymer, glass, etc.

If desired, waveguide 32 may also include one or more layers of holographic recording media (sometimes referred to herein as holographic media, grating media, or diffraction grating media) on which one or more diffractive gratings are recorded (e.g., holographic phase gratings, sometimes referred to herein as holograms, surface relief gratings, etc.). A holographic recording may be stored as an optical interference pattern (e.g., alternating regions of different indices of refraction) within a photosensitive optical material such as the holographic media. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating medium may include photopolymers, gelatin such as dichromated gelatin, silver halides, holographic polymer dispersed liquid crystal, or other suitable holographic media.

Diffractive gratings on waveguide 32 may include holographic phase gratings such as volume holograms (sometimes referred to herein as volume phase holograms (VPHs)) or thin-film holograms, meta-gratings, or any other desired diffractive grating structures. The diffractive gratings on waveguide 32 may also include surface relief gratings (SRGs) disposed at, in, or on one or more surfaces of the substrates in waveguide 32 (e.g., as modulations in thickness of a SRG medium layer layered onto a lateral surface of waveguide 32), gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles). Other light redirecting elements such as louvered mirrors may be used in place of diffractive gratings in waveguide 32 if desired (e.g., within separate waveguide layers). The diffractive gratings may include meta-materials or metasurfaces if desired.

As shown in FIG. 2, projector 26 may generate (e.g., produce and emit) image light 30 associated with image content to be displayed to eye box 24 (e.g., image light 30 may convey a series of image frames for display at eye box 24). Image light 30 may be collimated using a collimating lens in projector 26 if desired. Optical system 22 may be used to present image light 30 output from projector 26 to eye box 24. If desired, projector 26 may be mounted within support structure 14 of FIG. 1 while optical system 22 may be mounted between portions of support structure 14 (e.g., to form a lens that aligns with eye box 24). Other mounting arrangements may be used, if desired.

Optical system 22 may include one or more optical couplers (e.g., light redirecting elements) such as input coupler 34, cross-coupler 36, and output coupler 38. In the example of FIG. 2, input coupler 34, cross-coupler 36, and output coupler 38 are formed at or on waveguide 32. Input coupler 34, cross-coupler 36, and/or output coupler 38 may be completely embedded within the substrate layers of waveguide 32, may be partially embedded within the substrate layers of waveguide 32, may be mounted to waveguide 32 (e.g., mounted to an exterior surface of waveguide 32), etc.

Waveguide 32 may guide image light 30 down its length via total internal reflection. Input coupler 34 may be configured to couple image light 30 from projector 26 into waveguide 32 (e.g., within a total-internal reflection (TIR) range of the waveguide within which light propagates down the waveguide via TIR), whereas output coupler 38 may be configured to couple image light 30 from within waveguide 32 (e.g., propagating within the TIR range) to the exterior of waveguide 32 and towards eye box 24 (e.g., at angles outside of the TIR range). Input coupler 34 may include an input coupling prism, an edge or face of waveguide 32, a lens, a steering mirror or liquid crystal steering element, diffractive grating structures (e.g., volume holograms, SRGs, etc.), partially reflective structures (e.g., louvered mirrors), or any other desired input coupling elements.

As an example, projector 26 may emit image light 30 in direction +Y towards optical system 22. When image light 30 strikes input coupler 34, input coupler 34 may redirect image light 30 so that the light propagates within waveguide 32 via total internal reflection towards output coupler 38 (e.g., in direction +X within the TIR range of waveguide 32). When image light 30 strikes output coupler 38, output coupler 38 may redirect image light 30 out of waveguide 32 towards eye box 24 (e.g., back along the Y-axis). In implementations where cross-coupler 36 is formed on waveguide 32, cross-coupler 36 may redirect image light 30 in one or more directions as it propagates down the length of waveguide 32 (e.g., towards output coupler 38 from a direction of propagation as coupled into the waveguide by the input coupler). In redirecting image light 30, cross-coupler 36 may also perform pupil expansion on image light 30 in one or more directions. In expanding pupils of the image light, cross-coupler 36 may, for example, help to reduce the vertical size of waveguide 32 (e.g., in the Z direction) relative to implementations where cross-coupler 36 is omitted. Cross-coupler 36 may therefore sometimes also be referred to herein as pupil expander 36 or optical expander 36. If desired, output coupler 38 may also expand image light 30 upon coupling the image light out of waveguide 32.

Input coupler 34, cross-coupler 36, and/or output coupler 38 may be based on reflective and refractive optics or may be based on diffractive (e.g., holographic) optics. In arrangements where couplers 34, 36, and 38 are formed from reflective and refractive optics, couplers 34, 36, and 38 may include one or more reflectors (e.g., an array of micromirrors, partial mirrors, louvered mirrors, or other reflectors). In arrangements where couplers 34, 36, and 38 are based on diffractive optics, couplers 34, 36, and 38 may include diffractive gratings (e.g., volume holograms, surface relief gratings, etc.). In one illustrative implementation that is described herein as an example, input coupler 34, cross-coupler 36, and output coupler 38 may each be formed from SRGs that are disposed in different respective regions of the same layer of SRG medium layered onto the same lateral surface (side) of waveguide 32 (e.g., opposite eye box 24). The SRGs may have sufficient bandwidth to diffract all wavelengths of image light 30, such that additional stacked waveguides with additional SRGs for handling different wavelengths are not necessary.

The example of FIG. 2 is merely illustrative. Optical system 22 may include multiple waveguides that are laterally and/or vertically stacked with respect to each other. Each waveguide may include one, two, all, or none of couplers 34, 36, and 38. Waveguide 32 may be at least partially curved or bent if desired. One or more of couplers 34, 36, and 38 may be omitted. If desired, optical system 22 may include a single optical coupler that performs the operations of both cross-coupler 36 and output coupler 38 (sometimes referred to herein as an interleaved coupler, a diamond coupler, or a diamond expander) or cross-coupler 36 may be separate from output coupler 38.

The operation of waveguide 32 on image light 30 is shown in FIG. 2. Waveguide 32 may also be used to direct light 4 from infrared emitter(s) 8 towards eye box 24 and to direct reflected light 4R from eye box 24 towards infrared sensor(s) 6 (FIG. 1). Additionally or alternatively, optical system 22 may direct world light towards eye box 24 and/or towards a world-facing camera in system 10.

Figure 3:
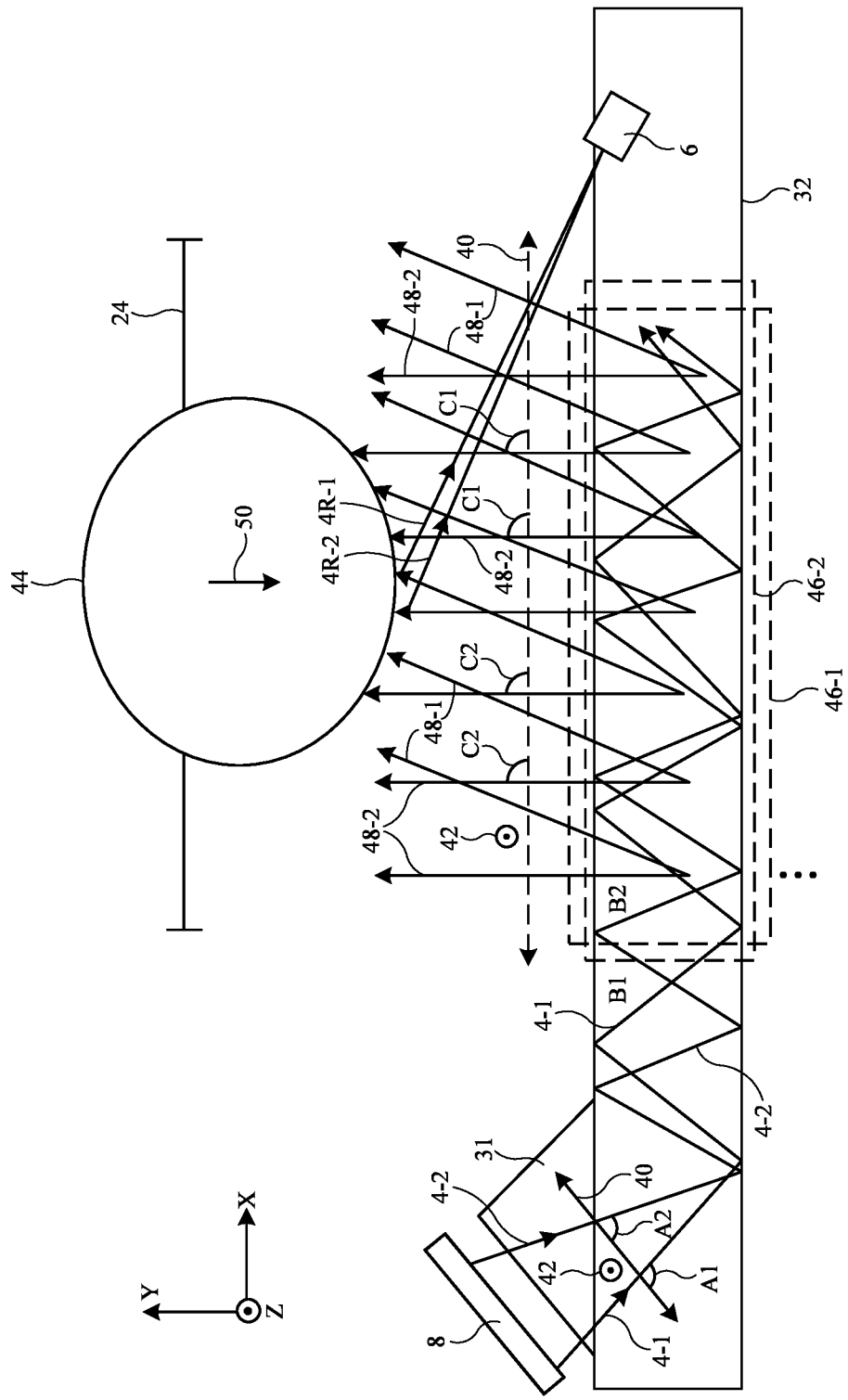
FIG. 3 is a top view of an illustrative optical system having a waveguide with one dimensional diffractive gratings for coupling sensor light out of the waveguide in different directions in accordance with some embodiments.

FIG. 3 is a top view showing how waveguide 32 may direct light 4 from infrared emitter(s) 8 towards eye box 24. While an implementation in which the same waveguide 32 directs image light 30 (FIG. 2) and light 4 for performing gaze tracking is described herein as an example, if desired optical system 22 (FIG. 1) may include different waveguides for directing image light 30 and light 4.

As shown in FIG. 3, waveguide 32 may include an input coupler such as input coupler 31 that couples light 4 into waveguide 32. Input coupler 31 may be separate from input coupler 34 for image light 30 (FIG. 2) or may also form input coupler 34 for image light 30. In the example of FIG. 3, input coupler 31 is a transmissive input coupling prism. This is merely illustrative and, if desired, input coupler 31 may include diffractive gratings (e.g., volume holograms, an SRG, metagratings, etc.), one or more mirrors (e.g., a louvered mirror), a reflective input coupling prism, partial reflectors, an angled edge or facet of waveguide 32, a lens, and/or any other desired input coupling structures.

IR emitter(s) 8 may emit light 4. Input coupling prism 31 may couple light 4 into waveguide 32. Waveguide 32 may propagate light 4 via total internal reflection (TIR) towards the portion of waveguide 32 overlapping eye box 24. IR sensor 6 may be disposed at, on, or in waveguide 32 (e.g., the portion of waveguide 32 opposite input coupling prism 31), may be co-located with IR emitter(s) 8 (e.g., in an integrated gaze tracking sensor module), or may be disposed elsewhere in the system. If desired, a frame or other housing portion for the system may shield camera 6 from view.

Waveguide 32 may include output couplers 46 for coupling light 4 out of waveguide 32 and towards eye box 24. Output couplers 46 may include diffractive gratings such as sets of volume holograms or SRGs, louvered mirrors, metagratings or any other desired output coupling structures. Output couplers 46 may be separate from the output coupler 38 that couples image light 30 out of waveguide 32 (e.g., output couplers 46 may redirect or diffract the wavelengths of light 4 but not the wavelengths of image light 30). Output couplers 46 may sometimes be referred to herein as gaze tracking output couplers or IR output couplers.

The gaze tracking sensor may implement glint-based eye tracking. In these arrangements, the light 4 incident upon eye 44 within eye box 24 reflects off of a portion of eye 44 as glints of reflected light 4R. The glints may be directed towards IR sensor 6, which captures IR sensor data from the glints. The control circuitry may process the sensor data to identify the gaze direction of eye 44 within eye box 24.

In some implementations, glint-based eye tracking involves placing several infrared LEDs on waveguide 32 extending around and/or through the lateral area subtended by eye box 24. However, such LEDs have a direct line of sight to the user's eye at the eye box and can undesirably obstruct the user's view. By directing light 4 out of waveguide 32 using output couplers 46, IR emitter(s) 8 may be located far away from the user's line of sight while still providing infrared light to the user's eye as if the light were emitted within the user's field of view, thereby allowing for optimal images of glints from the user's eye by IR sensor 6.

If desired, IR emitter(s) 8 and output couplers 46 may be configured to effectively replicate a one-dimensional line of IR LEDs extending through the field of view of eye box 24 (e.g., parallel to the X-axis or any other axis). Effectively replicating IR LEDs in this way may allow gaze tracking to be performed as if IR emitter(s) 8 were located within the field of view without obstructing the field of view and may allow the gaze tracking sensor to detect the horizontal position of eye 44 within eye box 24 (e.g., along the X-axis). For example, different portions of the sensing area of IR sensor 6 may be illuminated when eye 44 is at different horizontal locations within eye box 24 and the control circuitry may detect the horizontal position of eye 44 based on which portion of IR sensor 6 is illuminated by reflected light 4R.

To effectively replicate a one-dimensional line of IR LEDs extending through the field of view of eye box 24, IR emitter(s) 8 may include one or more light sources that each emits light 4 that is collimated in (along) a first axis and that is diverging or divergent in (along) a second axis perpendicular to the first axis. As shown in the example of FIG. 3, IR emitter(s) 8 may emit light 4 that is collimated in the direction of axis 40, sometimes referred to herein as collimated axis 40 or collimated direction 40, and that is diverges in the direction of axis 42. Axis 42 is perpendicular to axis 40 and may sometimes be referred to herein as diverging axis 42. Axes 40 and 42 are defined relative to (in the reference frame of) light 4 at each point along its propagation path (e.g., axes 40 and 42 may be at different orientations with respect to the X-Y-Z axes of FIG. 3 depending on where the light is in the system). Axes 40 and 42 may sometimes also be referred to herein as directions 40 and 42. While illustrated as linear in FIG. 3 for the sake of simplicity, axes 40 and 42 may each equivalently extend along arcs of angular (e.g., spherical) space.

IR emitter(s) 8 may include one or more light sources that emit different beams (pupils) of light 4 in different directions along collimated axis 40 and towards input coupler 31. At the same time, light 4 may be diverging (uncollimated) along diverging axis 42. FIG. 3 shows a simplest case in which IR emitter(s) 8 emit light in two different directions for the sake of clarity. In general, IR emitter(s) 8 may emit light in any desired number of two or more different directions.

As shown in FIG. 3, IR emitter(s) 8 may emit first light 4-1 that is collimated in a first direction oriented at a first angle A1 with respect to collimated axis 40. IR emitter(s) 8 may also emit second light 4-2 that is collimated in a second direction oriented at a second angle A2 with respect to collimated axis 40. Light 4-2 and 4-1 may be at the same wavelength. While a single ray of light 4-1 and a single ray of light 4-2 are illustrated in FIG. 3 for the sake of clarity, in general, light 4-1 may span a first beam width (pupil) and light 4-2 may span a second beam width (pupil).

Input coupler 31 may couple light 4-1 and light 4-2 into waveguide 32 (e.g., within the TIR range of waveguide 32). Light 4-1 and 4-2 may propagate along waveguide 32 via TIR towards output couplers 46. Waveguide 32 may include a respective output coupler 46 for each of the directions of light 4 emitted by IR emitter(s) 8. Each output coupler 46 may couple the IR light emitted by IR emitter(s) 8 out of waveguide 32 in a different respective direction towards eye box 24, as shown by rays 48.

As shown in the example of FIG. 3, output couplers 46 include at least a first output coupler 46-1 and a second output coupler 46-2. Output coupler 46-1 may include a first diffractive grating structure (e.g., one or more diffractive gratings) and output coupler 46-2 may include a second diffractive grating structure (e.g., one or more diffractive gratings). For example, output coupler 46-1 may include a first set of one or more volume holograms, a first SRG, or a first metagrating whereas output coupler 46-2 includes a second set of one or more volume holograms, a second SRG, or a second metagrating. Output couplers 46-1 and 46-2 may, for example, be superimposed within the same volume of a grating medium layered onto a lateral (exterior) surface of waveguide 32 or embedded within waveguide 32 (e.g., sandwiched between transparent waveguide substrates). In other implementations, output couplers 46-1 and 46-2 may be disposed within separate layers of medium that are stacked or overlapping with respect to each other.

The diffractive grating(s) in output coupler 46-1 may be one-dimensional diffractive grating(s) that diffract light 4-1 (but not light 4-2) in a first direction along collimated axis 40 (e.g., within the X-Y plane) but not along diverging axis 42 (e.g., within the Y-Z plane). Similarly, the diffractive grating(s) in output coupler 46-2 may be one-dimensional diffractive grating(s) that diffract light 4-2 (but not light 4-1) in a second direction along collimated axis 40 (e.g., within the X-Y plane) but not along diverging axis 42 (e.g., within the Y-Z plane). The periodic structures of output couplers 46-1 and 46-2 (e.g., lines of constant refractive index when the output couplers include volume holograms or lines of constant media thickness when the output couplers include SRGs) may extend parallel to diverging axis 42.

For example, as shown in FIG. 3, because light 4-1 is emitted by IR emitter(s) 8 in a first direction (characterized by angle A1) and light 4-2 is emitted in a second direction (characterized by angle A2), light 4-1 is incident upon output coupler 46-1 at a first incident angle B1 whereas light 4-2 is incident upon output coupler 46-2 at a second incident angle B2. The first diffractive grating(s) in output coupler 46-1 may diffract light of the wavelength of light 4 and from incident angle B1 onto a first output angle C1 with respect to collimated axis 40 (e.g., the first diffractive grating(s) may be Bragg-matched to light 4 incident at first incident angle B1 and output at first output angle C1). Angle C1 may lie outside of the TIR range of waveguide 32 and may be oriented towards eye box 24. As such, output coupler 46-1 may couple (diffract) light 4-1 out of waveguide 32 and in a first direction towards eye box 24, as shown by rays 48-1 oriented at first output angle C1 relative to collimated axis 40. Output coupler 46-1 may output light 4-1 multiple times (e.g., within multiple replicated beams or pupils split in one dimension along collimated axis 40) as the light continues to propagate along waveguide 32 (e.g., with each bounce or pass of light 4-1), thereby filling eye box 24 with light 4-1 along collimated axis 40.

At the same time, the second diffractive grating(s) in output coupler 46-2 may diffract light of the wavelength of light 4 and from incident angle B2 onto a second output angle C2 with respect to collimated axis 40 (e.g., the second diffractive grating(s) may be Bragg-matched to light 4 incident at second incident angle B2 and output at second output angle C2). Angle C2 may lie outside of the TIR range of waveguide 32 and may be oriented towards eye box 24. As such, output coupler 46-2 may couple (diffract) light 4-2 out of waveguide 32 and in a second direction towards eye box 24, as shown by rays 48-2 oriented at second output angle C2 relative to collimated axis 40. Output coupler 46-2 may output light 4-2 multiple times (e.g., within multiple replicated beams or pupils split in one dimension along collimated axis 40) as the light continues to propagate along waveguide 32 (e.g., with each bounce of pass of light 4-1), thereby filling eye box 24 with light 4-2 along collimated axis 40. The diffractive grating(s) in output couplers 46-1 and 46-2 may be transmissive gratings (e.g., transmissive holograms or SRGs) and/or reflective gratings (e.g., reflective holograms or SRGs).

Light 4-1 may reflect off eye 44 (e.g., the cornea) as a first glint of reflected light 4R-1. Light 4-2 may reflect off eye 44 as a second glint of reflected light 4R-2. Camera 6 may be disposed at a location that receives reflected light 4R-1 and 4R-2 or, if desired, additional optics (e.g., one or more lenses, optical couplers, waveguides such as waveguide 32, etc.) may help to direct reflected light 4R-1 and 4R-2 towards camera 6. Camera 6 may gather IR sensor data in response to reflected light 4R-1 and 4R-2. Control circuitry may process the IR sensor data to detect the gaze direction of eye 44 (e.g., the tilt/orientation of eye 44) and/or the horizontal position of eye 44 within eye box 24.

If desired, IR emitter(s) 8 may emit light 4 at additional angles A and output couplers 46 may include additional output couplers (e.g., diffractive gratings) for diffracting the light 4 emitted at the additional angles A onto additional output angles C. Each direction may produce a respective well-defined glint of reflected light 4R. In this way, the diffraction of light 4 by all of the output couplers 46 on waveguide 32 may effectively approximate a one-dimensional array (e.g., as a continuous line or discrete array) of IR LED emitters (e.g., along collimated axis 40) that extends through the horizontal axis of eye box 24.

Figure 4:
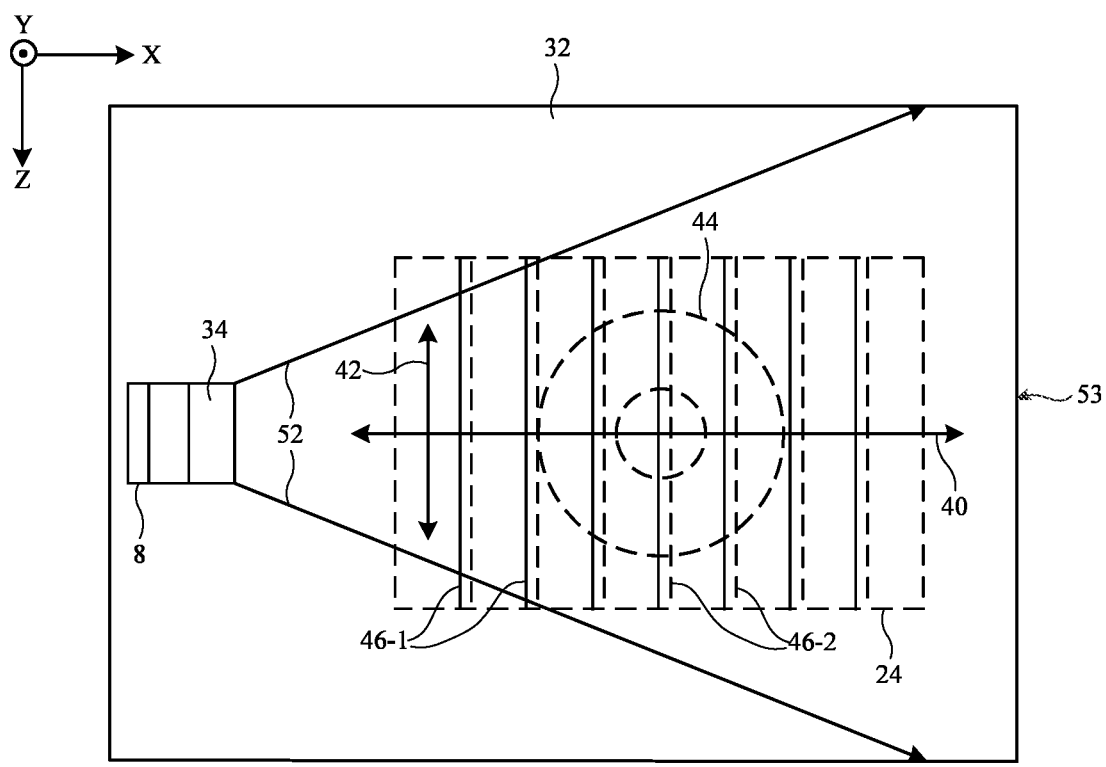
FIG. 4 is a front view of an illustrative waveguide having one dimensional diffractive gratings for coupling sensor light out of the waveguide in different directions in accordance with some embodiments.

FIG. 4 is a front view (as taken in the direction of arrow 50 of FIG. 3) that illustrates the orientations of the one-dimensional gratings in output couplers 46-1 and 46-2 on waveguide 32. As shown in FIG. 4, input coupler 34 may couple light 4 into waveguide 32 and towards the opposing end 53 of waveguide 32 (e.g., towards output couplers 46-1 and 46-2). The light may be diverging in a direction parallel to diverging axis 42 (e.g., within cone 52). At the same time, the light may be collimated in the perpendicular direction (e.g., along collimated axis 40).

Output couplers 46-1 and 46-2 may be disposed on waveguide 32 and overlapping eye box 24. The first diffractive grating(s) in output coupler 46-1 is/are one-dimensional gratings having parallel periodic structures (e.g., fringes) that extend in a single direction, parallel to diverging axis 42 and perpendicular to collimated axis 40. The first diffractive grating(s) may couple light 4-1 out of waveguide 32 and towards eye 44 in a first direction relative to collimated axis 40 (e.g., within the X-Y plane, at output angle C1 of FIG. 3). The second diffractive grating(s) in output coupler 46-2 is/are one-dimensional gratings having parallel periodic structures that extend in a single direction, parallel to diverging axis 42 and perpendicular to collimated axis 40 (e.g., parallel to the periodic structures of output coupler 46-1). The second diffractive grating(s) may couple light 4-2 out of waveguide 32 and towards eye 44 in a second direction relative to collimated axis 40 (e.g., within the X-Y plane, at output angle C2 of FIG. 3).

Figure 5:
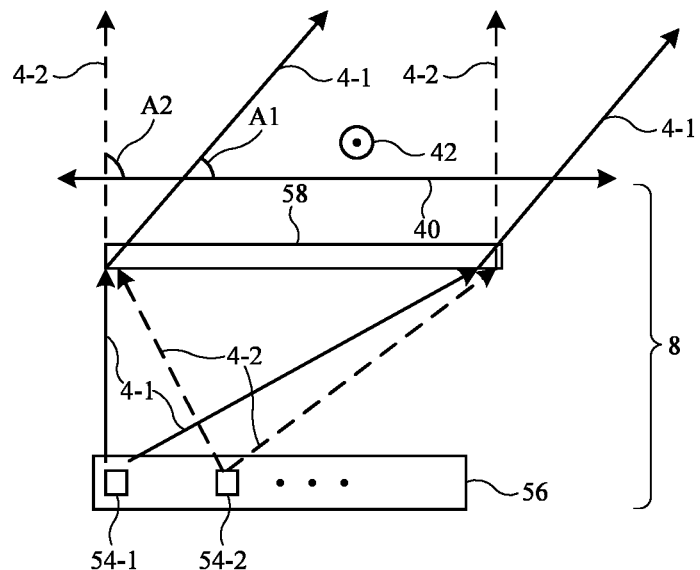
FIG. 5 is a cross-sectional side view along a collimated axis showing how illustrative light sources may emit sensor light in different directions using a cylindrical lens in accordance with some embodiments.

IR emitter(s) 8 may include one or more light sources and one or more optical elements that allow for the emission of light 4 at different angles A relative to collimated axis 40 (e.g., at least light 4-1 and 4-2 of FIG. 3). FIG. 5 is a cross-sectional side view (along collimated axis 40) showing one example in which IR emitter(s) 8 include different light sources for emitting light 4 at different angles A relative to collimated axis 40.

As shown in FIG. 5, IR emitter(s) 8 may include a set of (IR) light sources 54 (e.g., IR LEDs) that includes at least a first light source 54-1 and a second light source 54-2. IR light sources 54 may be disposed on a common substrate 56 if desired (e.g., a shared chip, package, module, circuit board, etc.). IR light source 54-1 may emit light 4-1 and IR light source 54-2 may emit light 4-2. The light as emitted may be diverging along both diverging axis 42 and collimated axis 40.

IR emitter(s) 8 may also include a lens such as cylindrical lens 58 overlapping light sources 54. Cylindrical lens 58 may redirect (collimate) light 4 along collimated axis 40 without redirecting (collimating) light 4 along diverging axis 42. Cylindrical lens 58 may redirect incident light 4 in different directions based on where the light is incident upon the lens along collimated axis 40. For example, as shown in FIG. 5, cylindrical lens 58 may redirect light 4-1 from light source 54-1 in a first direction at angle A1 relative to collimated axis 40, without collimating the light in the perpendicular direction along diverging axis 42. Cylindrical lens 58 may also redirect light 4-2 from light source 54-2 in a second direction at angle A2 relative to collimated axis 40, without collimating the light in the perpendicular direction along diverging axis 42.

Figure 6:
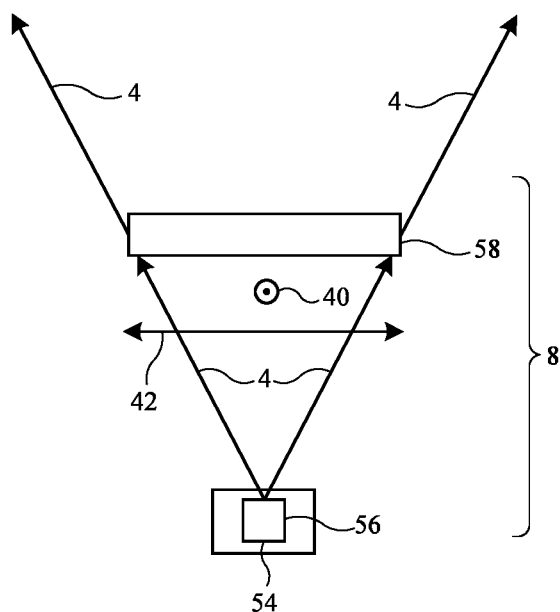
FIG. 6 is a cross-sectional side view along a diverging axis showing how illustrative light sources may emit sensor light using a cylindrical lens in accordance with some embodiments.

FIG. 6 is an orthogonal cross-sectional side view (along diverging axis 42) of the IR emitter(s) 8 in the example of FIG. 5. As shown in FIG. 6, cylindrical lens 58 does not redirect light 4 from light sources 54 at angles relative to diverging axis 42. As such, light 4 continues to diverge in the direction of diverging axis 42.

Figure 7:
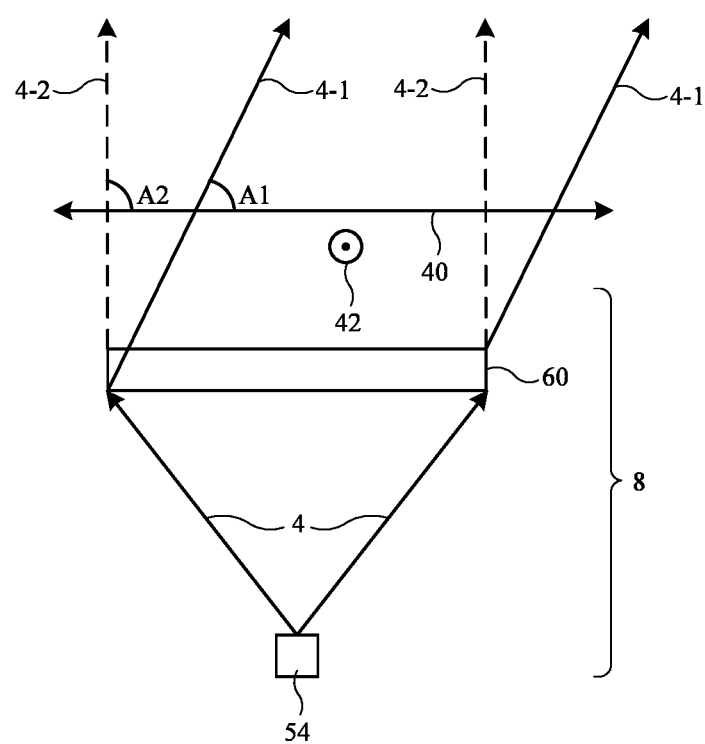
FIG. 7 is a cross-sectional side view along a collimated axis showing how an illustrative light source may emit sensor light in different directions using a diffractive optical element in accordance with some embodiments.

The example of FIGS. 5 and 6 in which IR emitter(s) 8 include multiple light sources 54 is illustrative and non-limiting. If desired, IR emitter(s) 8 may include a single light source and a diffractive optical element (DOE) for directing light 4 at different angles. FIG. 7 is a cross-sectional side view (along collimated axis 40) showing one example of how IR emitter(s) 8 may include a single light source and a diffractive optical element (DOE) for directing light 4 at different angles.

As shown in FIG. 7, IR emitter(s) 8 may include DOE 60 overlapping a single light source 54. Light source 54 may emit light 4 (e.g., diverging along both collimated axis 40 and diverging axis 42). DOE 60 may include a set of one or more diffractive gratings (e.g., volume holograms, SRGs, metagratings, etc.) that diffract incident light 4 onto different output directions (e.g., as a multiplexed holographic lens). For example, DOE 60 may include different overlapping diffractive gratings (e.g., 2D structures where the hologram pitch varies spatially across the aperture of the hologram), where at least a first grating diffracts incident light 4 onto a first angle A1 relative to collimated axis 40 (as light 4-1) and at least a second grating diffracts incident light 4 onto a second angle A2 relative to collimated axis 40 (as light 4-2). DOE 60 may include additional gratings for diffracting incident light 4 onto additional angles A if desired. The diffractive gratings in DOE 60 may be transmissive gratings (as shown in FIG. 7) or may, if desired, include reflective gratings. This may, for example, produce a one-dimensional focus of light 4 similar to a cylindrical lens.

Figure 8:
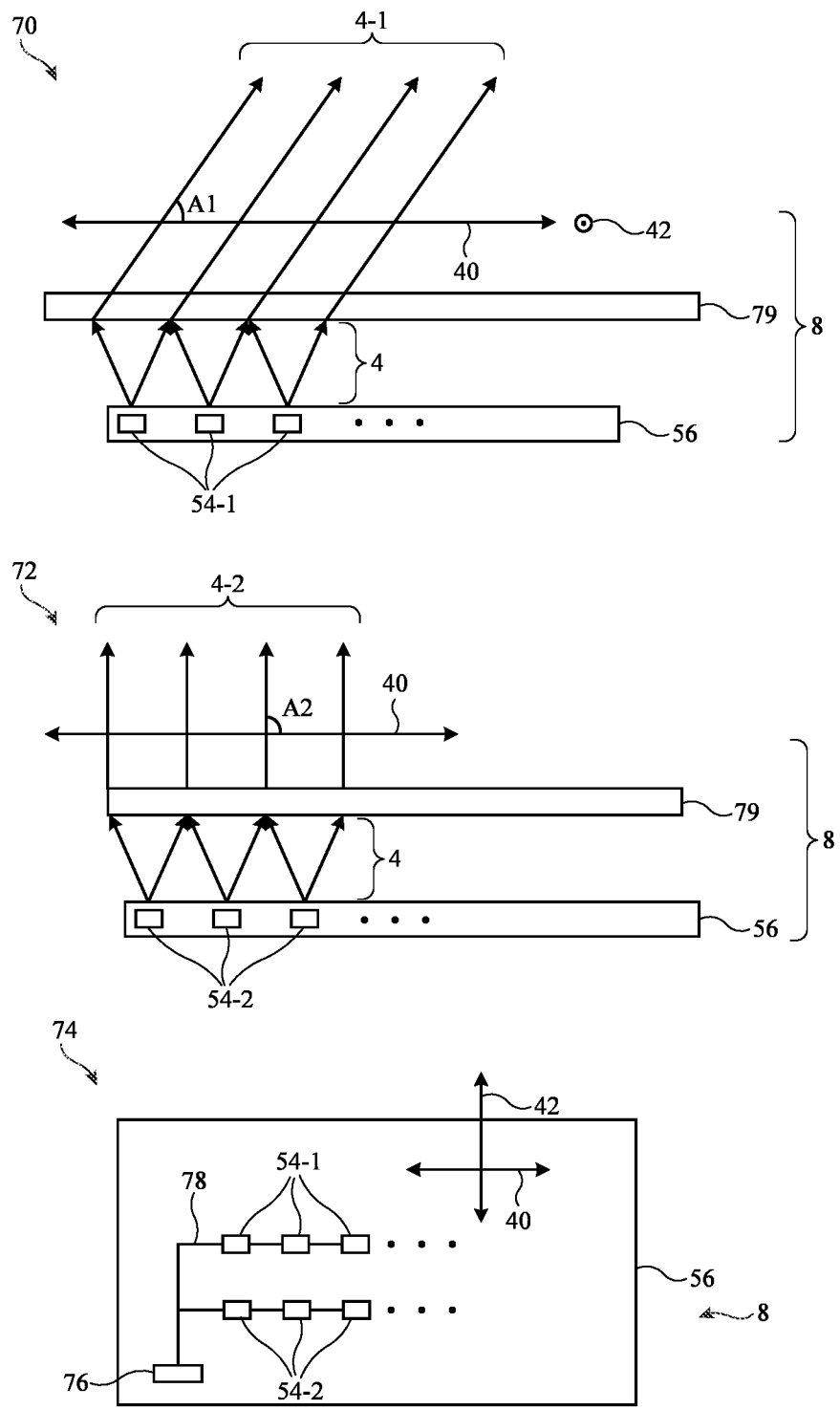
FIG. 8 is a diagram showing how different rows of an illustrative array of light sources may be selectively activated to emit sensor light in different directions using a lenslet array in accordance with some embodiments.

In other implementations, IR emitter(s) 8 may include an array of light sources 54 and an overlapping lenslet array. FIG. 8 is a diagram showing one example of how IR emitter(s) 8 may include an array of light sources 54 and an overlapping lenslet array.

Portion 74 of FIG. 8 is a top-down view showing how IR emitter(s) 8 may include an array of light sources 54 (e.g., VCSELs) arranged in independently addressable rows on substrate 56. Collimated axis 40 and diverging axis 42 lie in the plane of the page in portion 74 of FIG. 8. The light sources 54 in each row may be driven by driver 76 over drive paths 78 to emit light 4. Driver 76 may activate one or more rows of light sources 54 at a given time, causing those rows emit light 4. The light sources 54 may include at least a first row of light sources 54-1 and a second row of light sources 54-2.

Portion 70 of FIG. 8 shows a cross-sectional side view (along collimated axis 40) of the first row of light sources 54-1 in IR emitter(s) 8. A lenslet array 79 may be disposed overlapping light sources 54 (e.g., lenslet array 79 may include a respective lenslet overlapping each light source 54 in the array of light sources). The lenslets in lenslet array 79 overlapping each row of light sources 54 may redirect the light 4 emitted by that light source 54 in a different respective direction (e.g., at a different respective angle A) with respect to collimated axis 40. For example, the lenslets in lenslet array 79 overlapping the row of light sources 54-1 may redirect the light 4 emitted by the row of light sources 54-1 in a first direction oriented at angle A1 relative to collimated axis 40 (as light 4-1).

Portion 72 of FIG. 8 shows a cross-sectional side view (along collimated axis 40) of the second row of light sources 54-2 in IR emitter(s) 8. The lenslets in lenslet array 79 overlapping the row of light sources 54-2 may redirect the light 4 emitted by the row of light sources 54-2 in a second direction oriented at angle A2 relative to collimated axis 40 (as light 4-2). By selectively activating different rows of the array of light sources 54, driver 76 can control the direction at which light 4 is directed into waveguide 32 (along collimated axis 40). Lenslet array 79 may be replaced with one or more optical diffusers if desired.

Figure 9:
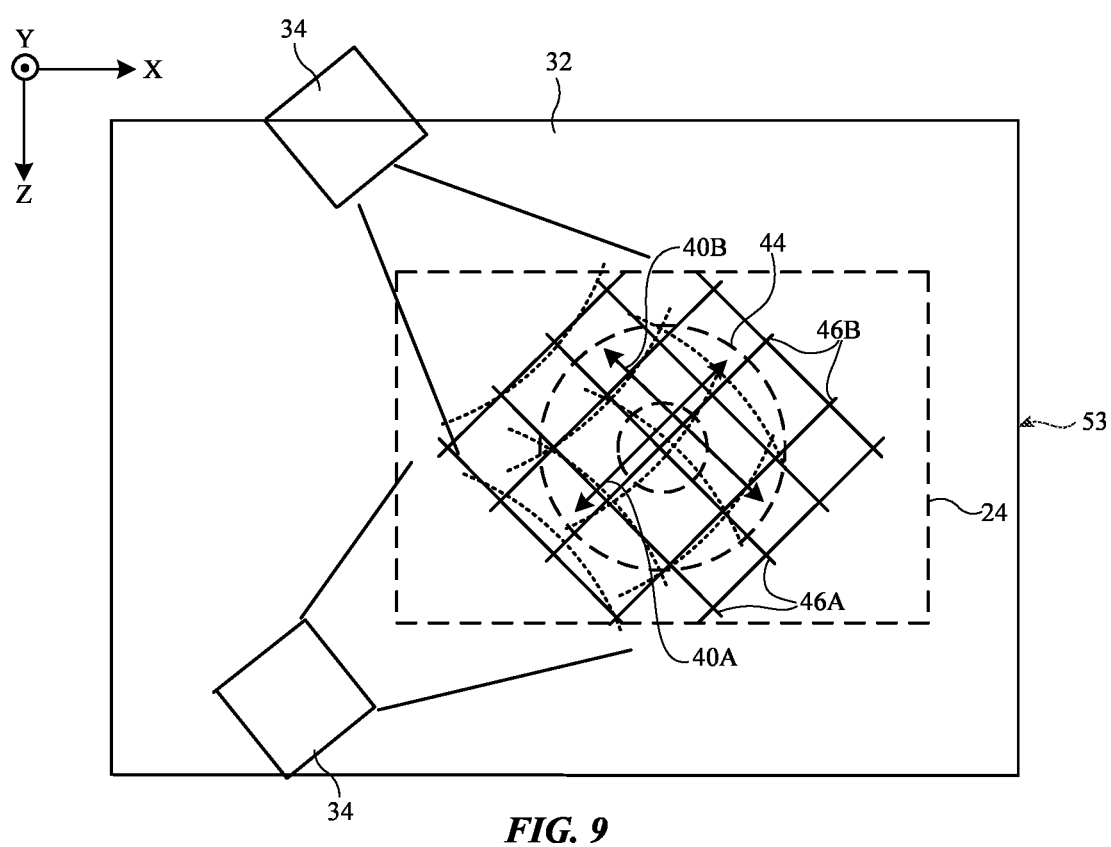
FIG. 9 is a front view of an illustrative waveguide having two non-parallel one dimensional diffractive gratings for coupling sensor light out of the waveguide in different directions in accordance with some embodiments.

If desired, to further increase the robustness and accuracy of eye tracking, the output couplers 46 on waveguide 32 (FIG. 3) may be configured to effectively form multiple parallel lines emitters that are oriented in different directions. FIG. 9 is a front view of waveguide 32 showing one example in which the output couplers 46 on waveguide 32 are configured to effectively form two orthogonal parallel line emitters overlapping eye box 24.

As shown in FIG. 9, the output couplers 46 on waveguide 32 may include at least a first set of output couplers 46A having a first collimated axis 40A (sometimes referred to herein as grating axis 40A) and a second set of output couplers 46B having a second collimated axis 40B (sometimes referred to herein as grating axis 40B). The first set of output couplers 46A may include a set of diffractive gratings (e.g., the diffractive gratings of at least output couplers 46-1 and 46-2 of FIG. 3) that diffract incident light 4 in different directions relative to (along) collimated axis 46A (whereas the light remains diverging in the direction orthogonal to collimated axis 46A). This may configure the first set of output couplers 46A to effectively form a one-dimensional line of IR LEDs along collimated axis 40A and overlapping eye box 24.

The second set of output couplers 46B may include a set of diffractive gratings (e.g., the diffractive gratings of at least output couplers 46-1 and 46-2 of FIG. 3) that diffract incident light 4 in different directions relative to (along) collimated axis 46B (whereas the light remains diverging in the direction orthogonal to collimated axis 46B). This may configure the set of output couplers 46B to effectively form a one-dimensional line of IR LEDs along collimated axis 40B and overlapping eye box 24.

The diffractive gratings in the sets of output couplers 46A and 46B may be oriented such that collimated axis 40A has any desired non-parallel orientation with respect to collimated axis 40B. As one example, collimated axis 40B may be orthogonal to collimated axis 40A. In this example, the periodic structures of the diffractive gratings in the first set of output couplers 46A may extend orthogonal to the periodic structures of the diffractive gratings in the second set of output couplers 46B and may extend parallel to collimated axis 40B. On the other hand, the periodic structures of the diffractive gratings in the second set of output couplers 46B may extend orthogonal to the periodic structures of the diffractive gratings in the first set of output couplers 46A and may extend parallel to collimated axis 40A. If desired, different projectors and/or input couplers 34 may be used to provide the image light diffracted by output couplers 46A and 46B respectively. The curved dotted lines of FIG. 9 show how the light is diffracted out of the plane of the page at the corresponding output angle, where each pupil bounce is diffracted out into a slightly curved line according to the corresponding grating vector and incident light vector.

The example of FIG. 9 is illustrative and non-limiting. If desired, the output couplers may include more than two sets of output couplers that each have a different respective collimated axis oriented in a different direction. This may, in general, allow the output couplers to effectively form arbitrary shapes of equivalent LED emitters within the field of view of eye box 24 (e.g., parallel lines, rings, etc.). IR emitter(s) 8 may include different sets of one or more light sources 54 and any other desired optics (e.g., light sources arranged in rows at different orientations as shown in FIG. 8, light sources arranged in different patterns, cylindrical lenses as shown in FIG. 7, lenslets or microlenses as shown in FIG. 8, DOEs as shown in FIG. 7, etc.) that configure IR emitter(s) 8 to emit light in different directions along each of the collimated axes 40 implemented by the different sets of output couplers 46 on waveguide 32 (e.g., for diffraction by the corresponding set of output couplers 46).

In the example of FIG. 3, each output coupler 46 is illustrated as extending across the entire eye box 24 (e.g., along the X-axis). This is illustrative and non-limiting. If desired, two or more output couplers 46 may be disposed at different spatial locations along the direction of TIR propagation of light 4 for diffracting the same incident angle of light 4 onto different output angles towards the eye box.

Figure 10:
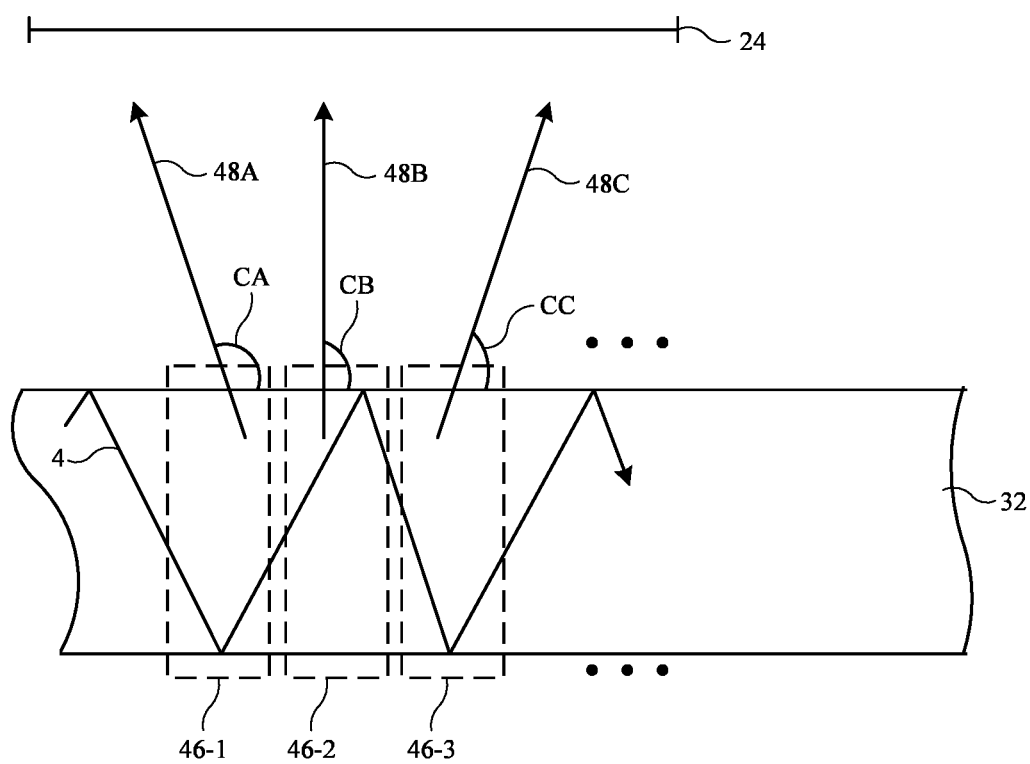
FIG. 10 is a top view showing how gratings at different spatial locations along a waveguide may redirect infrared light onto different output angles towards an eye box in accordance with some embodiments.

FIG. 10 is a diagram showing how two or more output couplers 46 may be disposed at different spatial locations along the direction of TIR propagation of light 4 for diffracting the same incident angle of light 4 onto different output angles towards the eye box. As shown in FIG. 10, waveguide 32 may include a first output coupler 46-1 (e.g., a first set of one or more diffractive gratings) in a first spatial region of waveguide 32 (e.g., overlapping a first spatial region of eye box 24), a second output coupler 46-2 (e.g., a second set of one or more diffractive gratings) in a second spatial region of waveguide 32 (e.g., overlapping a second spatial region of eye box 24), a third output coupler 46-3 (e.g., a third set of one or more diffractive gratings) in a third spatial region of waveguide 32 (e.g., overlapping a third spatial region of eye box 24), etc. Output couplers 46-1, 46-2, and 46-3 may be disposed in sequential order along the direction of propagation of light 4 via TIR within waveguide 32 (e.g., output coupler 46-2 may be laterally interposed between output couplers 46-1 and 46-3, etc.).

The gratings in each output coupler may diffract light 4 from the same incident angle towards eye box 24 at a different respective output angle. For example, output coupler 46-1 may diffract light 4 from a given incident angle onto a first output angle CA (as shown by arrow 48A), output coupler 46-2 may diffract light 4 from the given incident angle onto a second output angle CB (as shown by arrow 48B), output coupler 46-3 may diffract light 4 from the given incident angle onto a third output angle CC (as shown by arrow 48C), etc. In this way, each TIR bounce of light 4 may be diffracted towards eye box 24 at a different respective angle (e.g., the light 4 diffracted by each output coupler 46 may fill a different respective spatial region of eye box 24). Each angle of diffracted light 4 will thereby produce a different respective glint that is detected by infrared sensor(s) 6. Increasing the number of output couplers, spatial regions, and output angles of light 4 may increase the resolution with which the eye is tracked in eye box 24.

If desired, light 4 may be provided to output couplers 46 (FIGS. 3-10) at the same wavelength. If desired, light 4 may be sequentially provided to waveguide 32 at different wavelengths over time. Changing the wavelength of light 4 (e.g., time multiplexing the wavelength of light 4) may serve to change the output angle of one or more of the gratings in one or more of output couplers 46 for a given incident angle over time (e.g., a given output coupler 46 may diffract light 4 of a first wavelength and from a first incident angle onto a first output angle towards eye box 24, the given output coupler 46 may diffract light 4 of the first wavelength from the first incident angle onto a second output angle different from the first output angle, etc.). Infrared emitter(s) 8 may adjust the wavelength of light 4 over time to adjust the output angles of output couplers 46 in addition to or instead of adjusting the angle A of the light 4 as emitted by infrared emitter(s) 8 (e.g., via selective activation of different rows of light sources 54 in the example of FIG. 8). Time multiplexing the wavelength of light 4 and thus the output angle of light 4 from output couplers 46 may be used to produce different glints at different times and/or to encode desired patterns in the reflected infrared light that is then sensed by the infrared sensor(s). In general, the light sources 54 in infrared emitter(s) 8 (e.g., FIGS. 3-8) may be any desired fixed or adjustable light sources (e.g., broadband sources such as infrared LEDs, monochromatic sources such as VCSELs, etc.). Infrared emitter(s) 8 may adjust the wavelength output by narrowband sources in infrared emitter(s) 8 such as VCSELs by tuning the current used to drive the VCSELs, using a pulse width modulation (PWM) scheme, etc. This may, for example, be used to change the output angle of output coupler(s) 46 over time.

The example of FIGS. 3-9 in which light 4 is collimated along a first axis (e.g., collimated axis 40) and diverging along a second axis (e.g., diverging axis 42) is illustrative and non-limiting. If desired, light 4 may be collimated along both first and second orthogonal axes (e.g., diverging axis 42 may be replaced with a collimated axis and light 4 may be collimated along that axis as well as collimated axis 40). This may, for example, allow for detection of the position in an additional dimension (e.g., along the Z-axis of FIG. 3) of the light 4 output from waveguide 32. If desired, this may be used across multiple regions of eye box 24 to allow for detection of eye 44 within eye box 24 along the additional dimension (e.g., along the Z-axis of FIG. 3).

If desired, infrared emitter(s) 8 may output, emit, or project different predetermined patterns, shapes, symbols, or other structured illumination in light 4 (e.g., within corresponding relatively small fields of view) for illuminating different regions of the eye box. Infrared sensor(s) 6 may then detect eye location based on which shape is detected in the reflected light 4 (e.g., a first shape or glint structure may be associated with presence of the eye at a first location whereas a second shape or glint structure may be associated with the presence of the eye at a second location in the eye box, etc.). In other words, light 4 may be spatially structured so as to be distinguishable as a particular glint that is then detected by the infrared sensor(s). This may also be performed by frequency modulating light 4 at infrared emitter(s) 8 (e.g., where different frequencies correspond to different glints or spatial locations) or by activating different light sources in infrared emitter(s) 8 at different times.

If desired, the pattern of emission of light 4 can be laid out so that the horizontal and vertical location of eye 44 in eye box 24 is given from the glint location on infrared sensor(s) 6 (e.g., on an array of sensor pixels). However, the eye relief or Y-dimension will be ambiguous with horizontal location in some cases. To derive eye relief or Y-location, the returned angles may be optimized such that a unique pattern of specularly reflected spots (e.g., glints) are provided to infrared sensor(s) 6 focused at infinity, such that each location within eye box 24 has a uniquely encoded set of imaged glints.

The foregoing is merely illustrative and various modifications can be made to the described embodiments. The foregoing embodiments may be implemented individually or in any combination.

What is claimed is:

1. An electronic device comprising:
a waveguide;
one or more light sources configured to emit first infrared light collimated at a first angle with respect to a first axis and configured to emit second infrared light collimated at a second angle with respect to the first axis, wherein the second angle is different from the first angle and the first and second infrared light is divergent along a second axis orthogonal to the first axis;
an input coupler configured to couple the first and second infrared light into the waveguide;
a first one-dimensional diffractive grating on the waveguide and configured to diffract the first infrared light out of the waveguide at a third angle with respect to the first axis; and
a second one-dimensional diffractive grating overlapping the first one-dimensional diffractive grating on the waveguide, wherein the second one-dimensional diffractive grating is configured to diffract the second infrared light out of the waveguide at a fourth angle with respect to the first axis, the fourth angle being different from the third angle.

2. The electronic device of claim 1, further comprising:
a camera configured to generate sensor data in response to a reflected version of the first infrared light and a reflected version of the second infrared light.

3. The electronic device of claim 1, wherein the one or more light sources comprise a first light source configured to generate the first infrared light and a second light source configured to generate the second infrared light, the electronic device further comprising:
a cylindrical lens overlapping the first and second light sources and configured to collimate the first infrared light at the first angle with respect to the first axis and configured to collimate the second infrared light at the second angle with respect to the first axis.

4. The electronic device of claim 1, wherein the one or more light sources comprises a light source configured to generate the first and second infrared light, the electronic device further comprising:
a diffractive optical element (DOE) overlapping the light source, the DOE being configured to diffract the first infrared light at a first angle with respect to the first axis and being configured to diffract the second infrared light at a second angle with respect to the first axis.

5. The electronic device of claim 1, wherein the one or more light sources comprises an array of light sources arranged in rows, the array of light sources includes a first row of light sources configured to generate the first infrared light and a second row of light sources configured to generate the second infrared light, and the electronic device further comprises:
a lenslet array overlapping the array of light sources, wherein the lenslet array includes first lenslets overlapping the first row of light sources and configured to redirect the first infrared light at the first angle with respect to the first axis, and wherein the lenslet array includes second lenslets overlapping the second row of light sources and configured to redirect the second infrared light at the second angle with respect to the first axis.

6. The electronic device of claim 1, wherein the one or more light sources is further configured to emit third infrared light collimated at a fifth angle with respect to a third axis and configured to emit fourth infrared light collimated at a sixth angle with respect to the third axis, the third axis is oriented non-parallel to the first axis, the third and fourth infrared light is divergent along a fourth axis orthogonal to the third axis, the input coupler is configured to couple the third and fourth infrared light into the waveguide, and the electronic device further comprises:
a third one-dimensional diffractive grating on the waveguide and configured to diffract the third infrared light out of the waveguide at a seventh angle with respect to the third axis; and
a fourth one-dimensional diffractive grating overlapping the third one-dimensional diffractive grating on the waveguide, wherein the fourth one-dimensional diffractive grating is configured to diffract the fourth infrared light out of the waveguide at an eighth angle with respect to the third axis, the eighth angle being different from the seventh angle.

7. The electronic device of claim 1, wherein the first one-dimensional diffractive grating has first periodic structures and the second one-dimensional diffractive grating has second periodic structures, the second periodic structures extending parallel to the first periodic structures and the second axis, and the second periodic structures extending orthogonal to the first axis.

8. The electronic device of claim 7, wherein the first one-dimensional diffractive grating and the second one-dimensional diffractive grating are superimposed within a same volume of a layer of a grating medium.

9. The electronic device of claim 7, wherein the first one-dimensional diffractive grating comprises a first volume hologram and the second one-dimensional diffractive grating comprises a second volume hologram.

10. The electronic device of claim 7, wherein the first one-dimensional diffractive grating comprises a surface relief grating (SRG).

11. The electronic device of claim 7, wherein the first one-dimensional diffractive grating comprises a diffractive metasurface.

12. An electronic device comprising:
a waveguide configured to propagate first infrared light and second infrared light;
a first diffractive grating on the waveguide and having first periodic structures;
a second diffractive grating overlapping the first diffractive grating on the waveguide and having second periodic structures that extend parallel to the first periodic structures, wherein
the first infrared light is incident on the first and second diffractive gratings at a first incident angle,
the second infrared light is incident on the first and second diffractive gratings at a second incident angle that is different from the first incident angle,
the first diffractive grating is configured to diffract the first infrared light out of the waveguide at a first output angle with respect to a first axis,
the second diffractive grating is configured to diffract the second infrared light out of the waveguide at a second output angle with respect to the first axis, and
the first axis is oriented orthogonal to the first and second periodic structures; and
a camera configured to generate sensor data in response to a reflected version of the first infrared light diffracted by the first diffractive grating and a reflected version of the second infrared light diffracted by the second diffractive grating.

13. The electronic device of claim 12, wherein the first infrared light is divergent along a second axis after diffraction by the first diffractive grating, the second infrared light is divergent along the second axis after diffraction by the second diffractive grating, and the second axis is orthogonal to the first axis.

14. The electronic device of claim 12, wherein the waveguide is configured to propagate third infrared light, the electronic device further comprising:
a third diffractive grating overlapping the first and second diffractive gratings on the waveguide and having third periodic structures, wherein
the third infrared light is incident on the first, second, and third diffractive gratings at a third incident angle that is different from the first and second incident angles,
the third diffractive grating is configured to diffract the third infrared light out of the waveguide at a third output angle with respect to a third axis,
the third axis is non-parallel with respect to the first axis,
the third periodic structures extend orthogonal to the third axis, and
the third axis is orthogonal to the first axis.

15. The electronic device of claim 12, wherein the first diffractive grating comprises a volume hologram or a surface relief grating.

16. An electronic device comprising:
one or more light sources configured to emit infrared light;
optics configured to collimate the infrared light at a first angle with respect to a first axis and at a second angle with respect to the first axis;
a waveguide configured to propagate the infrared light;
overlapping output couplers on the waveguide that are configured to diffract the infrared light out of the waveguide at different angles with respect to the first axis; and
a camera configured to receive a reflected version of the infrared light diffracted out of the waveguide by the overlapping output couplers.

17. The electronic device of claim 16, wherein the overlapping output couplers comprise diffractive gratings with parallel periodic structures extending orthogonal to the first axis.

18. The electronic device of claim 16, the one or more light sources being configured to adjust the infrared light over a set of different wavelengths as a function time and the overlapping output couplers are configured to diffract the infrared light at a different respective output angle for each wavelength in the set of different wavelengths.

19. The electronic device of claim 16, the one or more light sources being configured to frequency modulate the infrared light.

20. The electronic device of claim 16, wherein the optics are configured to collimate the infrared light along a second axis orthogonal to the first axis.

* * * * *